[19] United States Patent
Bajorat et al.

[11] Patent Number: 5,723,537
[45] Date of Patent: Mar. 3, 1998

[54] PIGMENT PASTES AND METHOD FOR MAKING

[75] Inventors: Gerda Bajorat, Wuppertal; Claudia Hamel, Erkrath; Hartmut Kern, Wuppertal, all of Germany

[73] Assignee: Herberts Gesellschaft mit beschrankter Haftung, Wuppertal, Germany

[21] Appl. No.: 462,441

[22] Filed: Jun. 5, 1995

Related U.S. Application Data

[63] Continuation of Ser. No. 114,687, Aug. 31, 1993, abandoned.

[30] Foreign Application Priority Data

Sep. 2, 1992 [DE] Germany .................. 42 29 196.8

[51] Int. Cl.$^6$ .................. C08J 5/10; C08K 13/02; C08L 67/02
[52] U.S. Cl. .................. 524/604; 524/558; 524/605; 525/165; 525/177
[58] Field of Search .................. 524/413, 600, 524/604, 287, 314, 773, 776, 558, 605; 525/165, 177

[56] References Cited

U.S. PATENT DOCUMENTS

| 4,410,657 | 10/1983 | Loch | 524/548 |
| 5,015,688 | 5/1991 | Bederke et al. | 524/600 |
| 5,344,857 | 9/1994 | Umezawa et al. | 523/409 |

FOREIGN PATENT DOCUMENTS

| 2014678 | 4/1990 | Canada . | |
| 1521396 | 8/1978 | United Kingdom . | |

*Primary Examiner*—Vasu Jagannathan
*Assistant Examiner*—U. K. Rajguru
*Attorney, Agent, or Firm*—Schweitzer Cornman Gross & Bondell LLP

[57] ABSTRACT

Pigment pastes are produced by pasting or blending one or several pigments and/or fillers in a paste resin based on a polyester oligomer polyacrylate which is obtainable by radical polymerisation of A) 80–50 wt % of
   a) one or several hydroxyfunctional acrylic acid esters and/or methacrylic acid esters and
   b) one or several monofunctional ethylenically unsaturated acids, as well as, optionally,
   c) one or several alpha,beta-ethylenically unsaturated monomers without functional groups in B) 20–50 wt % of one or several hydroxyfunctional polyester oligomers with a calculated molecular weight of 200–1000, a hydroxy number of 280–600 and an acid number of 0–1.5, obtainable by polycondensation of one or several diols, polyols and dicarboxylic acids and derivatives thereof, whereby the monomers a), b) and c) are used in such quantities as to ensure that the polyester oligomer polyacrylate obtained has a hydroxyl number of 150–390 and an acid number of 16–40. The pigment pastes are suitable for the pigmentation of the most diverse coating agents, both water-based and non-aqueous. Also described are the pigment pastes obtained and the use thereof in the production of coating agents and lacquer coatings.

7 Claims, No Drawings

PIGMENT PASTES AND METHOD FOR MAKING

This is a continuing application of U.S. Ser. No. 08/114,687, filed on Aug. 31, 1993, now abandoned.

The invention relates to the provision of a pigment having wide applicability and which is suitable in particular for the production of pigmented basecoat and topcoat lacquers.

Since the introduction of water-dilutable basecoat and topcoat lacquers the problem arises for lacquer manufacturers of having to produce and stockpile every colour tone in the form of the water-dilutable lacquer and also of the solvent-based lacquer or the relevant initial products, so as to be able to conform to the different equipment available to the users. In the case of automobile lacquers, for example, the automobile assembly-line lacquer of the same colour tone and the automobile repair lacquer, optionally in several variants as regards the drying mechanism, have to be available.

In respect of each lacquer system it is necessary to make use Of a special pasting component for the production of a suitable pigment paste. After production of the pliant paste the formulation of the lacquer is completed with, in each case, one or several additional binding agents. In this regard the constituents must be coordinated with one another so as to obtain a suitable coating agent—eg. the coating agent has to be stable in storage and satisfy the demanding optical requirements. In this connection it is possible to effect pasting within the main binding agent of the lacquer, or special paste resins (pasting resins) are used with a view to production of the pigment paste.

A general problem now consists in the need to make available and stockpile a pigment paste for each colour tone in respect of each different lacquer system. As a result, manufacture becomes costly and considerable storekeeping becomes necessary.

Particular problems arise in the case of the production and storage of water-dilutable lacquer systems or the water-dilutable pigment pastes on which they are based. In this case use can only be made of corrosion-resistant production plants and barrels, made of high-quality alloy steel, for example, and the temperatures prevailing at the storage depot must be such as to prevent freezing, since this may result in the aqueous lacquer materials being damaged.

In EP-A-0 052 224 pigment pastes are described which serve to produce aqueous or solvent-containing lacquers. They consist of binding agents with a high solvent content based on copolymers of water-soluble N-vinyl compounds. However, lacquers produced with such pastes exhibit high sensitivity to water.

In DE-A 39 10 829 aqueous coating agents are described which are produced on the basis of water-soluble polyester oligomer polyacrylates, which have been neutralised with bases, together with crosslinking agents. These coating agents are particularly suitable for use as clear-lacquer coating agents. The binding agents are used as an aqueous solution.

The object of the invention is the provision of a pigment paste which can be used in various lacquer systems, for example in aqueous and non-aqueous lacquer systems, by means of which the disadvantages stated above, such as high development cost, a considerable storage requirement, small deposit sizes and instability when exposed to frost, are avoided.

As used throughout the specification and the claims, a "pasting resin" or a "grinding resin" is the special paste-forming component for making a pigment paste by blending or grinding a pigment into such resin.

It has been shown that this task can be achieved by the provision of a process for producing a pigment paste by pasting or blending one or several pigments and/or fillers in a paste resin (pasting resin), said process being characterised in that use is made by way of paste resin of a polyester oligomer polyacrylate which is obtainable by radical polymerization of A) 80–50 wt % of
  a) one or several hydroxyfunctional (meth)acrylic acid esters (the term (meth)acrylic used here should be taken to mean acrylic and/or methacrylic) and
  b) one or several monofunctional ethylenically unsaturated acids and, optionally,
  c) one or several alpha,beta-ethylenically unsaturated monomers differing from a) and b) and without functional groups, in B) 20–50 wt % of one or several polyester oligomers with a calculated molecular weight of 200–1000, preferably 300–600, an OH-number of 280–600, preferably 400–800 mg KOH/g, and an acid number of 0–1.5 mg KOH/g, obtainable by polycondensation of one or several diols, polyols and dicarboxylic acids and derivatives thereof, whereby the monomers a), b) and c) are used in such quantities as to ensure that the polyester oligomer polyacrylate obtained has a hydroxyl number of 150–390 mg KOH/g and an acid number of 16–40, preferably 20–30 mg KOH/g. The invention also relates to pigment pastes which have been produced as described above and which exhibit a ratio of pigment or filler to paste resin, in each case relative to the weight of solids, of 0.05 to 2.5:1.

In the production of the polyester oligomer polyacrylate which is used in accordance with the invention the polyester oligomer component B) is submitted and the monomer component A) is polymerised therein. Polyester oligomer polyacrylates of this type are described in DE-A-39 10 829 by way of binding agent for aqueous coating agents.

The calculated molecular weight M is determined in accordance with T. C. Patton, Alkyd Resin Technology, "Formulating Techniques and Allied Calculations", 1962, page 106 ff, as follows $$M = \frac{W}{(M_o - e_a) + \frac{W_{(AN)}}{56100}}$$

M=average molecular weight calculated
W=weight of all components less condensation water
$M_o$=number of all moles
$e_a$=equivalents of the acid
$W_{(AN)}$=acid number of the polyester oligomer The polyester oligomer can be used for production of the polyester oligomer polyacrylate without solvent as sole reaction medium.

In the production of the polyester oligomer polyacrylate, however, it is also possible to add a solvent for the polyester oligomer. Any typical lacquering solvent may be used.

Suitable solvents are preferably those which are miscible with water to an unlimited extent—eg. monovalent aliphatic alcohols such as those having 2 to 4 carbon atoms, eg. ethanol and isopropanol, or ketones, eg. acetone or methyl ethyl ketone, or glycol ethers such as methyl glycol, ethyl glycol, butoxyethanol, methoxypropanol, ethoxypropanol and methoxypropoxypropanol, or diols such as ethylene glycol and propylene glycol, or polyether diols such as polyethylene glycol and polypropylene glycol, or any other solvents pertaining to other classes of compound, said solvents being miscible with water to an unlimited extent, or of mixtures of the aforementioned compounds or classes of compounds. But use may optionally also be made, in part only, of those solvents which are only miscible with water to a limited extent or not miscible with water at all. The organic solutions of the polyester oligomer acrylates possess a solvent content of up to 30 wt %, preferably below 20 wt %.

The polyester oligomer used as reaction medium in the production of the polyester oligomer polyacrylate component used in accordance with the invention as pasting resin may be produced from polyols, dicarboxylic acids and diols. Polycondensation is effected according to conventional processes familiar to one skilled in the art, for example in the presence of conventional esterification catalysts and at elevated temperatures of eg, 180° to 230° C. in a melt.

Examples of the polyol are those with More than two OH groups, such as aliphatic triols and tetrols with 2 to 6 carbon atoms, such as trimethylolethane, triethylolpropane, glycerine, 1,2,4-butanetriol, 1,2,6-hexanetriol and pentaerythritol.

Examples of the dicarboxylic acids are aliphatic saturated and unsaturated dicarboxylic acids such as maleic acid, fumaric acid, succinic acid, adipic acid, azelaic acid, sebacic acid; cycloaliphatic saturated and unsaturated dicarboxylic acids and aromatic dicarboxylic acids, such as phthalic acid, isophthalic acid, endomethylenetetrahydrophthalic acid, endoethylenetetrahydrophthalic acid and cyclohexane dicarboxylic acid (1.2, 1.3 and 1.4), itaconic acid, muconic acid and camphoric acid, or optionally the possible anhydrides thereof.

Examples of useable diols are aliphatic diols such as ethylene glycol, propylene glycol (1.3 and 1.2), butanediol, hexanediol (1.6), neopentyl glycol; polyether glycols of ethylene and of propylene with up to 6 monomer structural units, such as diethylene glycol, triethylene glycol, tetraethylene glycol and hexaethylene glycol; and cycloaliphatic diols such as 1,3-dimethylolcyclohexane and 1,4-dimethylolcyclohexane.

In the polyester oligomer or the solution thereof, in a monoalcohol for example, a hydromxyfunctional (meth)acrylate ester, a monoethylenically unsaturated acid and optionally a (meth)acrylic acid ester without hydroxy functions, either on their own or in a mixture, are subjected to radical polymerisation in the presence of a radical initiator. Examples of radical initiators are:

dialkyl peroxides such as di-tert.-butyl peroxide, di-cumyl peroxide; diacyl peroxides such as di-benzoyl peroxide, di-tauroyl peroxide; hydroperoxides such as cumene hydroperoxide, tert.-butyl hydroperoxide; peresters such as tert.-butylperbenzoate, tert.-butylperpivalate, tert.-butyl-per-3,5,5-trimethylhexanoate, tert.butyl-per-2-ethylhexanoate; peroxydicarbonates such as di-2-ethylhexyl-peroxydicarbonate, dicyclohexyl-peroxydicarbonate; perketals such as 1,1-bis-(tert.-butylperoxy)3,5,5-trimethylcyclohexane, 1,1-bis(tert.-butylperoxy)-cyclohexane; ketone peroxides such as cyclohexanone peroxide, methylisobutylketone peroxide and azo compounds such as 2,2'-azo-bis(2,4-dimethylvaleronitrile), 2,2'-azo-bis(2-methylbutyronitrile), 1,1'-azo-biscyclohexanecarbonitrile, azo-bis-isobutyronitrile.

The radical initiators are generally added in a quantity of 0.1 to 4 wt % relative to the weighed sample of monomer.

Examples of the useable hydroxyfunctional (meth)acrylic esters a) are (meth)acrylic esters of ethylene glycol, propylene glycol (1.2 and 1.3), butanediol (1.4), hexanediol (1.6), as well as polyethylene glycol mono(meth)acrylate with 6 to 8 ethylene glycol units and n-propylene glycol mono(meth)acrylate with 5 to 6 propylene glycol units. Preferred examples are hydroxyethylacrylate-caprolactone adducts, butanediol(1.4)mono(meth)acrylate, polypropylene glycol mono(meth)acrylate and polyethylene glycol mono(meth)acrylate.

Examples of the α,β-ethylenically unsaturated carboxylic acids b) are acrylic acid or methacrylic acid, as well as maleic acid and fumaric acid and the half-esters thereof with aliphatic alcohols.

Examples of the α,β-ethylenically unsaturated monomers c) without functional groups are: (meth)acrylic acid esters of alcohols with 1 to 12 carbon atoms in the chain, such as methyl alcohol, ethyl alcohol, n-propyl alcohol, isopropyl alcohol, butyl(n-, iso- and tert.-) alcohol, hexyl alcohol, 2-ethylhexyl alcohol and lauryl alcohol, as well as aromatic vinyl compounds such as styrene, vinyltoluene and α-methylstyrene.

Paste resins which are useable according to the invention are obtained in solvent-free or organically dissolved form.

With a view to production of the pigment paste according to the invention the polyester oligomer polyacrylates can also be used after being neutralised with bases. The amines which are customary in the lacquering industry are particularly suitable as bases, whereby use is preferably made of volatile organic amines of low molecular weight, or of ammonia. Neutralisation of the polyester oligomer polyacrylate is optionally effected subject to heating with a view to obtaining a favourable working viscosity, or after addition of water-compatible or water-soluble organic solvents. The base is added in such an amount as to ensure that the pH-value of the neutralised product obtained lies around 7.0 to 10 after dilution with water and is preferably 7.8 to 9.

It is possible for all conventional known pigments to be worked into the pigment pastes according to the invention. The term "pigments" here should be understood to mean all conventional inorganic and/or organic pigments, but also fillers and other dyestuffs.

For the pigment pastes according to the invention use can be made in particular of all conventional inorganic and/or organic colouring pigments, such as carbon black, titanium dioxide, and pigments made from phthalocyanine, perylene or quinacridone. Effect-producing pigments such as metallic pigments or interference pigments may also be added. To these it is in addition possible to add colourless pigments—eg, micronised titanium dioxide or silicon dioxide or dyestuffs with a view to obtaining special optical effects.

With the process according to the invention the ratio of pigment or filler to paste resin is preferably in the range 0.05 to 2.5:1 relative to the weight of solids, depending on the type of pigment used.

During or after production it is possible to add to the pigment pastes according to the invention further conventional additives such as dispersing agents, anti-foam agents, wetting agents and anti-settling agents such as pyrogenic silicon dioxide. It is also possible to add to the pigment paste further aids which are customary in lacquering and which are to be supplied to the complete coating agent—eg, levelling agents.

The pasting operation in the process according to the invention may be effected in the customary manner familiar to one skilled in the art, for example by dispersing the pigments in suitable grinding aggregates such as pearl mills, and requires no further explanation.

Pasting is preferably effected in the organic solution of the polyester oligomer polyacrylate or in the solvent-free form thereof. The mixture consisting of the paste resin, which is optionally dissolved, pigments, fillers and additives is dispersed until the desired fineness of grain of the pigments is obtained. Suitable grain sizes generally have a magnitude of up to about 15 μm, preferably below 10 μm.

Effect-producing pigments, such as metallic or pearlescent pigments, are mixed with or solubilised in polyester oligomer polyacrylate used according to the invention or the organic solution thereof, resulting in the formation of an effect-producing pigment paste.

As a result of this working method the occurrence of foam is largely prevented and a universally useable pigment paste is obtained which is stable in storage and when exposed to frost.

From these pastes optionally containing organic solvents it is possible to produce aqueous pigment pastes by dilution with water after prior neutralisation with bases. Suitable by way of bases are, in particular, the amines which are customary in the lacquering industry, whereby use is preferably made of volatile organic amines of low molecular weight, or of ammonia.

The pigment pastes produced according to the invention can be used for the production of water-dilutable and solvent-based pigmented coating agents. For this purpose they are, in each case, converted into a suitable aqueous or non-aqueous form. They are suitable in particular for the pigmentation of basecoat and topcoat lacquers.

The coating agents may be of the physically drying or the chemically crosslinking type. The pigmented coating agents may be of the one-component or the multi-component type. Examples are conventional or water-dilutable basecoat lacquers, conventional or water-dilutable oxidatively drying synthetic resin lacquers, conventional or water-dilutable one-component or multi-component topcoat lacquers of the chemically crosslinking type.

The chemically crosslinking topcoat lacquers are preferably based on those crosslinking mechanisms which proceed by virtue of-reactions of hydroxyl groups, such as the formation of urethane with optionally blocked isocyanate groups of conventional polyisocyanate crosslinking agents, the formation of ether, eg; by transetherification with alkoxymethyl groups of conventional aminoplastic crosslinking agents, transesterification/transamidisation with conventional transesterification/transamidisation crosslinking agents. But of course the pigment pastes according to the invention can also be used in coating agents which are crosslinkable as a result of other crosslinking reactions.

For the production of pigmented coating agents it is possible to add to the pigment pastes produced according to the invention lacquer binding agents, optionally crosslinking agents, conventional lacquering additives, solvents, in the case of water-dilutable coating agents optionally also neutralising agents and water in a suitable sequence, whereupon thorough homogenisation is effected. The lacquer binding agents are present in organically dissolved form or, in the case of production of water-dilutable pigmented coating agents, optionally also in a form diluted with water. The processes for producing coating agents are familiar to one skilled in the art and are established in accordance with the coating system selected.

The choice of the lacquer binding agents depends on the technological demands which the coating to be produced therewith has to meet. Thus conventional lacquer binding agents—eg, polyesters, acrylate resins or polyurethanes— may be used by way of lacquer binding agents. The crosslinking agents described in the literature may be added.

One or several different binding agents and crosslinking agents may be used. Optionally it is also possible to add further binding agents of the type represented by the paste resins mentioned above by way of lacquer banding agents.

In general the proportion of the polyester oligomer polyacrylate used for production of the pigment pastes according to the invention, said polyester oligomer polyacrylate being contained in the coating agents pigmented with said pigment pastes, amounts to up to 50 wt % relative to the solid resin (sum of paste resin plus binding agent plus, optionally, crosslinking agent). This preferably amounts to less than 30 wt %. Optionally the paste resin used in the pigment paste may also be the sole binding agent in addition to the crosslinking resin, as, for example, in the case of water-dilutable topcoat lacquers. Then the ratio of paste resin to crosslinking agent lies between 60:40 and 90:10 relative to the weight of solids.

In physically drying coating agents or coating agents which crosslink without the incorporation of hydroxyl groups the proportion of solid resin of the paste resin used according to the invention lies below 20 wt %, preferably below 15 wt %.

Attention should be paid to the fact that the pigment pastes produced according to the invention do not have a negative influence on the storage stability of the coating agents formulated therewith. Thus the pigment pastes used according to the invention in the case of two-component polyurethane topcoat lacquers, for example, should not be a constituent of the isocyanate component. Likewise it is favourable to combine the aqueous pigment pastes only with binding agents which are similarly charged. It is favourable to produce non-aqueous coating agents with non-aqueous pigment pastes.

The pigment pastes produced according to the invention can also be used for the tinting of coating agents. For this purpose they are used in small quantities. Use as tinting paste is possible in all water-dilutable or conventional coating agents, also in fillers for example. The pigment pastes produced according to the invention are characterised by universal applicability—is, in both water-dilutable and conventional coating agents. They do not require any particular measures to be taken during production, such as the combating of foam problems or the provision of corrosion-resistant production plants. In the water-free form there is no change in their stability in storage or their stability when exposed to frost.

The coating agents produced subject to the use of the pigment pastes produced according to the invention are suitable for the production of pigmented coatings of high optical quality and satisfy today's technological requirements.

The following examples elucidate the invention. Percentage figures relate to weight unless otherwise stated.

PRODUCTION OF A POLYESTER OLIGOMER

EXAMPLE 1

336.7 g trimethylolpropane, 366.8 g adipic acid and 2.97 g hexanediol are esterified with 5 g hypophosphoric acid in a 2-liter three-necked flask equipped with stirrer, separator, thermometer and reflux condenser at 180° C. to 230° C. in a melt so as to yield an acid number of 20.

Subsequently condensation is effected in a vacuum until an acid number<1.5 is attained.

The product so obtained has a storing residue of 94.5% (1 h, 150° C.), a viscosity of 3200 mPas (100%), a hydroxyl number of 460 and a colour number of 30 Haze.

7

PRODUCTION OF POLYESTER OLIGOMER POLYACRYLATES

EXAMPLE 2

717 g of the oligoester from Example 1 are submitted with 311.g butoxyethanol in a 4-liter three-necked flask equipped With stirrer, reflux condenser, dropping funnel and thermometer and heated to 140° C.

Subsequently a mixture consisting of 552 g butanediol monoacrylate, 946 g tert. butyl acrylate, 74 g acrylic acid and 100 g Trigonox C (tert. butylperbenzoate) is added dropwise for 4 hours and further polymerised for 4 hours.

The product had a storing residue of 84.0% (1 h, 150° C.) according to DIN 53182, a viscosity of 15830 mPas (DIN 53015), an acid number of 38.0 mg KOH/g solids (DIN 53402), an OH-number of 231 mg KOH/1 g solids (DIN 53240) and a colour number of 60 Haze (DIN 53409).

PRODUCTION OF PIGMENT PASTES

EXAMPLE 3

81.6 parts of the paste resin solution from Example 2 were diluted under the dissolver with 2 parts hexylene glycol and 10.4 parts butoxyethanol. Subsequently 6 parts pyrogenic silica (Aerosil R 972, manufactured by Degussa) were stirred in uniformly and ground in a pearl mill at 60° C. to a fineness of grain of 10 μm.

EXAMPLE 4

Under the dissolver 65 parts of the paste resin solution from Example 2 were added to 10 parts of the paste from Example 3 and 10 parts of a solvent mixture consisting of butoxyethanol, hexylene glycol and ethanol in a weight ratio of 8:2:2, 5 parts carbon black were simultaneously stirred in and diluted with an additional 10 parts of the aforementioned solvent mixture. Subsequently thorough grinding was effected in a pearl mill at 60° C. to a fineness of grain of <10 μm.

EXAMPLE 5

Under the dissolver 23 parts of the paste resin solution from Example 2 were added to 10 parts of the pigment paste from Example 3 and 7 parts of the solvent mixture from Example 4. Subsequently 60 parts of titanium dioxide were stirred in uniformly and then ground thoroughly in a pearl mill at 60° C. to a fineness of grain of 10–12 μm.

EXAMPLE 6

Under the dissolver 60 parts of the paste resin solution from Example 2 were added to 10 parts of the pigment paste from Example 3 and 20 parts of the solvent mixture from Example 4. Subsequently 10 parts of phthalocyanine blue (Heliogenblau L 6975 F, manufactured by BASF) were stirred in uniformly and then ground thoroughly in a pearl mill at 60° C. to a fineness of grain of <10 μm.

EXAMPLE 7

Under the dissolver 10 parts of the paste resin solution from Example 2 were added to 10 parts of the solvent mixture from Example 4. Subsequently 33 parts of a commercial aluminium paste (65% in test benzine/Solvesso 100, Alupaste R 507 ES, manufactured by Eckert) were stirred in and diluted with 47 parts of the aforementioned solvent mixture. Stirring was effected for 15 minutes at 20° C.

8

PRODUCTION OF PIGMENTED LACQUERS

EXAMPLE 8

(Solvent-Based 1-Component Topcoat Lacquer)

In the table below the stated quantities of a 70% solution of a medium-oily, non-drying alkyd resin were submitted with a proportion of phthalic acid of 32% dissolved in Solvesso 100 (I), a 55% isobutanolic solution of an melamine formaldehyde resin (II) etherified with isobutanol and the pigment paste was then added under the dissolver in accordance with the table below. After uniform intermixing 0.4 parts of a commercial levelling agent based on organosiloxane and 0.8 parts of a 1% xylolic solution of a phenylmethylsiloxane were added in each case and diluted with 11 parts of a solvent mixture consisting of 36% of a terpene hydrocarbon, 46% Solvesso 100 and 18% butyl acetate.

| Example | Amount I | Amount II | Paste |
|---|---|---|---|
| 8a | 25 parts | 28 parts | 34.8 parts from Ex. 4 |
| 8b | 25 parts | 21 parts | 41.8 parts from Ex. 5 |
| 8c | 21 parts | 26.5 parts | 40.3 parts from Ex. 6 |

EXAMPLE 9

(Water-Dilutable 1-Component Topcoat Lacquer)

25 parts of the paste resin solution from Example 2 were added under the dissolver to 14 parts of the pigment paste from Example 5, 9.5 parts of the pigment paste from Example 6 and 0.4 parts of the pigment paste from Example 4. After homogenisation 20 parts of a solution of 1 part dimethylethanol amine in 10 parts deionised water were slowly added and then carefully diluted with 14.1 parts of a mixture consisting of ethanol, butanol, butoxyethanol and deionised water in a ratio of 1:1:2:25. After homogenisation 17 parts of an 85% isobutanolic solution of a highly aminofunctional melamine formaldehyde resin etherified with methanol were stirred in.

EXAMPLE 10

(Solvent-Based 2-Component Topcoat Lacquer)

70 parts of a 55% solution of an acrylate resin with an acid number of 7 and a hydroxyl number of 140 mg KOH/g in a mixture consisting of xylene, butyl acetate and Solvesso 100 in a ratio of 20:16:9 were added under the dissolver to 11.9 parts of the pigment paste from Example 6, 0.5 parts of the pigment paste from Example 4 and 17.6 parts of the pigment paste from Example 5. Prior to application there were added to 100 parts of this mixture 50 parts of a 41% solution of an aliphatic polyisocyanate (Desmodur N 3390, manufactured by Bayer) in a mixture consisting of methoxypropyl acetate, Solvesso 100, butyl acetate and butyl glycol acetate in a ratio of 50:5:30:15 byway of crosslinking agent.

EXAMPLE 11

(Solvent-Based Metallic Basecoat Lacquer)

20 parts of a 55% solution of a commercial copolymer of ethylene and acrylic acid with an acid number of 40 mg KOH/g in a mixture consisting of butyl acetate and xylene in a ratio of 1:1 were added under the dissolver to 25 parts of a 25% solution of cellulose acetobutyrate (acetyl content 15% butyryl content 37%, hydroxyl content 0.8%) in a mixture consisting of butyl acetate and butanol in a ratio of 2:1. 9.5 parts of a 65% solution of a branched polyester with an acid number of 20 and a hydroxyl number of 80 mg KOH/g and a molecular weight ($M_w$) of 2000 in xylene, 4.5 parts of a butanolic solution of a melamine formaldehyde resin etherified with butanol and 4 parts of a carbamic acid resin based on butyl urethane and formaldehyde. Then 15 parts of the effect-producing pigment paste from Example 7 were stirred in homogeneously and diluted with 20 parts butyl acetate.

The pigment pastes contained in Examples 3 to 7 are stable in storage. They exhibit no tendency towards sedimentation and can be processed into coating agents even after storage. They can also be stored at −5° C. without becoming unusable.

The coating agents of Examples 8 to 11 exhibit good technical lacquering properties. They form coating agents which are stable in storage.

We claim:

1. A pigment paste which contains one or more pigments and which paste is based on a water-free polyester oligomer polyacrylate pasting resin prepared in the absence of water by free radical polymerization of
(A) 80–50 weight % of
  (a) one or several hydroxyfunctional acrylic acid esters and/or methacrylic acid esters,
  (b) one or several monofunctional ethylenically unsaturated acids, and optionally,
  (c) one or several alpha, beta-ethylenically unsaturated monomers differing from (a) and (b) and without functional groups, and
(B) 20–50 weight % of one or more hydroxyfunctional polyester oligomers having a molecular weight of 200–1000, a hydroxyl number of 280–600, and an acid number of 0–1.5 which is/are prepared by polycondensation of one or several diols, polyols, and dicarboxylic acids and derivatives thereof, the monomers (a), (b) and (c) being used in such quantities to obtain polyester oligomer polyacrylate with a hydroxyl number of 150–390, and an acid number of 16–40, by converting the resulting pasting resin into a pigment paste by blending the water-free pasting resin with an organic solvent with one or several pigments and/or fillers in a ratio of pigment or filler to pasting resin of 0.01 to 2.5:1 solids basis.

2. The pigment paste according to claim 1 characterised in that the radical polymerisation is carried out in the absence of solvents.

3. The pigment paste according to claim 1 characterised in that the radical polymerisation is carried out in the presence of one or several organic solvents.

4. The pigment paste according to one of claim 1 characterised in that after the pasting or blending the pigment paste is converted into the aqueous phase by neutralisation and dilution with water.

5. Process for the production of coating agents, characterised in that they are pigmented with a pigment paste as defined in claim 1.

6. A process for pigmenting an aqueous or nonaqueous coating agent by the pigment paste of claim 1.

7. A process for preparing a lacquer, comprising blending a coating agent prepared in accordance with claim 5, with other lacquer coating components.

* * * * *